(12) United States Patent  
Mou

(10) Patent No.: US 8,467,046 B2
(45) Date of Patent: Jun. 18, 2013

(54) GONIOPHOTOMETER

(75) Inventor: Tongsheng Mou, Zhejiang (CN)

(73) Assignee: Hangzhou Zhejiang University Sensing Instruments Co., Ltd., Hangzhou, Zhejiang (CN)

( * ) Notice: Subject to any disclaimer, the term of this patent is extended or adjusted under 35 U.S.C. 154(b) by 253 days.

(21) Appl. No.: 12/866,140

(22) PCT Filed: Jan. 23, 2009

(86) PCT No.: PCT/CN2009/070314
§ 371 (c)(1),
(2), (4) Date: Aug. 4, 2010

(87) PCT Pub. No.: WO2009/097813
PCT Pub. Date: Aug. 13, 2009

(65) Prior Publication Data
US 2010/0328672 A1  Dec. 30, 2010

(30) Foreign Application Priority Data

Feb. 4, 2008 (CN) .......................... 2008 1 0059812

(51) Int. Cl.
*G01J 1/00* (2006.01)
(52) U.S. Cl.
USPC ........................................................ 356/213
(58) Field of Classification Search
None
See application file for complete search history.

(56) References Cited

FOREIGN PATENT DOCUMENTS

CN  101059369 A  * 10/2007

OTHER PUBLICATIONS

International Search Report of PCT/CN2009/070314.

* cited by examiner

*Primary Examiner* — Gregory J Toatley
*Assistant Examiner* — Amanda Merlino
(74) *Attorney, Agent, or Firm* — Global IP Services; Tianhua Gu

(57) ABSTRACT

A goniophotometer has a main rotating table, a sync-rotating table, a luminaire rotating table and light detecting tubes (4-1, 4-2). The main rotating table has a main rotating axis (1-2) and a main mirror (1-4) reflecting the light from a luminaire under test (5). The sync-rotating table has a sync-rotating axis (2-2) and a sync-mirror (2-4) located in the reflection path of the main mirror (1-4). The sync-rotating axis (2-2) is coincident with the main rotating axis (1-2). The luminaire rotating table has a luminaire rotating axis (3-2) which can drive the rotation of the luminaire under test (5). The luminaire rotating axis (3-2) is perpendicular to the main rotating axis (1-2). The light detecting tubes (4-1, 4-2) are arranged in the emergent light path to detect the luminous intensity of the luminaire under test (5) in different direction.

13 Claims, 4 Drawing Sheets

GONIOPHOTOMETER

FIELD OF THE INVENTION

The invention relates to a goniophotometer, in particular to a goniophotometer with a main mirror and a synchronization mirror.

BACKGROUND OF THE INVENTION

The common goniophotometers with the mirrors can be classified into the following three types: The first one is the goniophotometer with rotating-mirror. A photo-detector is fixed in this goniophotometer. The luminous intensity of the luminaire under test in different directions can be detected through the autorotation of the mirror and the circumferential moving and autorotation in the space of the luminaire under test. As the luminaire under test is moving during the detecting process and the luminaire under test is in different environments with different positions, it is easily to be influenced by the environmental temperature and the air motion.

The second one is the goniophotometer with moving-mirror. The photo-detector is fixed or rotated with the moving mirror. With the mirror rotating around the luminaire under test and the autorotation of the luminaire under test in a fixed space position, the optical parameters of the luminaire under test in different directions can be detected. The advantage is that the luminaire under test has a fixed space position. Therefore, it cannot be easily influenced by the environmental temperature and the air motion; the disadvantages are that: the detected beam is changed with the cone and the detected distance is fixed. The large luminaire under test needs a larger space. In addition, since the detector is fixed and cannot follow the rotation, the sensitivity difference of the detector in different directions of the space can lead to a relatively big error.

The third one is the goniophotometer combining the moving mirror and the fixed mirror. The moving mirror and the light detector are fixed on the same rotating arm for synchronously rotating around the luminaire under test. In addition, a fixed mirror is arranged outside the detecting table for coordinating the moving mirror and the photo-detector. The advantage is that: the luminaire under test has a fixed space position, which is not easily to be influenced by the environmental temperature and the air motion; the disadvantage is that: the detected beam is always changing while rotating around the cone. Since the detector and the moving mirror are moving synchronously, it is difficult to arrange a series of diaphragms for eliminating the stray light between the detector and the light source. Or else, light beam blind angle can be existed; the beam axle is entered to the fixed mirror through each direction of the conical surface, and then reflected to the moving detector. Since the reflectance of the mirror in each direction of the space are discord, the obvious luminous intensity error will be introduced; besides, the surface shape error of the fixed mirror will cause that the detecting accuracy of the luminous intensity is sensitively influenced by the surrounding reflected stray light.

SUMMARY OF THE INVENTION

The invention aims to provide a goniophotometer with a high measuring accuracy. The technical proposals for dealing with the problem of the prior art adopted by the invention are as follows:

The goniophotometer of the invention comprises the main rotating table, the sync-rotating table, the luminaire rotating table and the light detecting tubes; the main rotating table comprises: the main base and the main rotating axis installed on the main base. The main rotating axis and the main mirror arm are tightly fixed. The main mirror is installed on the main mirror arm; the sync-rotating table comprises: the sync-base and the sync-rotating axis installed on the sync-base. The axis of the sync-rotating axis and the main rotating axis are coincident. The sync-mirror arm is installed on the sync-rotating axis. The sync-mirror is located in the reflection path of the main mirror; the reflection path of the sync-mirror is located on the sync-rotating axis; the luminaire rotating table comprises: the luminaire fixture and the luminaire rotating axis installed on the luminaire fixture. And the luminaire rotating axis is perpendicular to the main rotating axis. The luminaire under test is fixed and connected to the luminaire rotating axis; the light detecting tubes are installed in the light path.

During the work, the luminaire under test is fixed on the luminaire rotating axis. When rotating, the main mirror arm drives the rotation of the main mirror. The luminaire rotating axis drives the autorotation of the luminaire under test. The emergent lights of the luminaire under test in different directions are received by the light detecting tubes. Thus, the luminous intensity of the luminaire under test can be detected.

The advantages of the invention are as follows:
1. The sync-mirror synchronously rotating with the main mirror is adopted, which can eliminate the influence for the measuring results from the directivity of the mirror;
2. it is easy to position the diaphragm in the light channel to eliminate the stray light;
3. a plurality of light detecting tubes can be positioned on the different positions of the reflection path of the mirror for measurement which could widely extend the scope of detection;
4. the goniophotometer of the invention has the advantages of less occupied area and higher measuring accuracy.

DETAIL DESCRIPTION OF THE INVENTION

In order to clarify the substantial characteristics of the invention, more detailed description is given below with a combination of the attached figures of the specification and the specific implementation methods.

A detailed description is given below with a combination of the attached figures.

Figure 1:
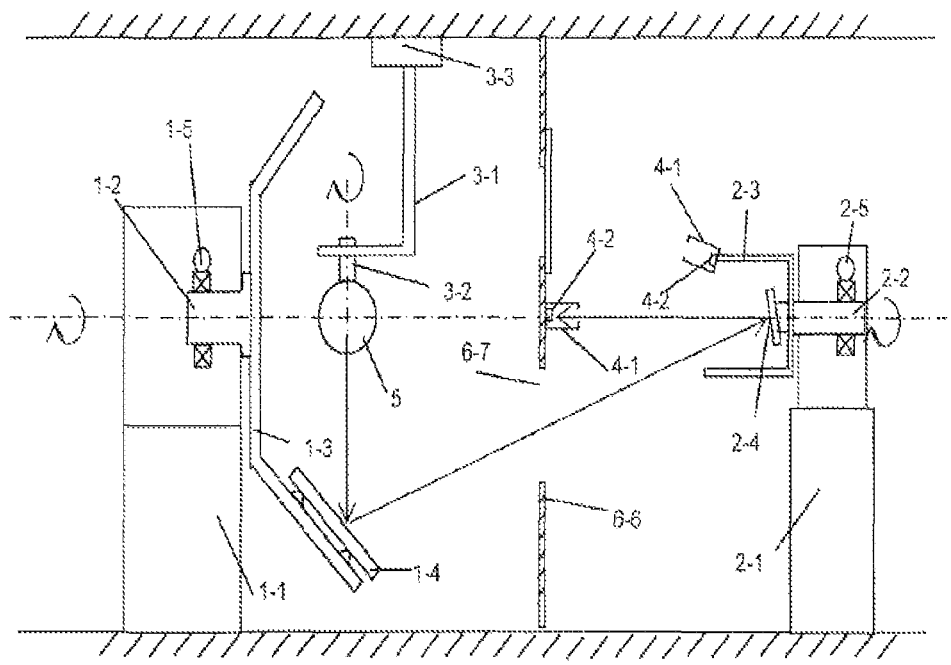
FIG. 1 is the schematic of the first structure of the invention.

As shown in FIG. 1, the goniophotometer comprises the main rotating table, the sync-rotating table, the luminaire rotating table and the light detecting tubes; the main rotating table comprises: the main base 1-1 and the main rotating axis 1-2 installed on the main base 1-1. The main rotating axis 1-2 and the main mirror arm 1-3 are tightly fixed. The main mirror 1-4 is installed on the main mirror arm 1-3; the sync-rotating table comprises: the sync-base 2-1 and the sync-rotating axis 2-2 installed on the sync-base 2-1. The sync-rotating axis 2-2 and the main rotating axis 1-2 are coincident. The sync-mirror arm 2-3 is installed on the sync-rotating axis 2-2. The sync-mirror 2-4 is installed on the sync-mirror arm 2-3. The sync-mirror 2-4 is located in the reflection path of the main mirror 1-4; the luminaire rotating table comprises: the luminaire fixture 3-1 and the luminaire rotating axis 3-2 installed on the luminaire fixture 3-1. The luminaire rotating axis 3-2 is perpendicular to the axis of the main rotating axis 1-2. The luminaire under test 5 and the luminaire rotating axis 3-2 are fixed and connected. In the embodiment of the figure, the luminaire fixture 3-1 is located between the main rotating table and the sync-rotating table and connected with the bracket 3-3. In order to further improve the detecting accuracy and make the optical axis of the luminaire under test fixed, as shown in the figure, the reflection path of the sync-mirror 2-4 is located on the sync-rotating axis 2-2. In order to broaden the dynamic scope of the measurement, as shown in the figure, two light detecting tubes are adopted. The first light detecting tube is located in the reflection path of the main mirror 1-4 and fixed on the sync-mirror arm 2-3; while the second light detecting tube is located in the reflection path of the sync-mirror 2-4. When the first light detecting tube is working, the second light detecting tube is not working. When the second light detecting tube is working, the sync-mirror arm 2-3 rotates a certain angle to separate the first light detecting tube and the reflection path of the main mirror 1-4. The reflected light of the main mirror 1-4 enters to the sync-mirror 2-4. And the second light detecting tube receives the reflected light of the sync-mirror 2-4.

The main rotating axis 1-2 and the sync-rotating axis 2-2 are respectively driven by the main motor 1-5 and the sync-motor 2-5 for synchronous rotation. The luminaire rotating axis 3-2 is driven to rotate by the luminaire motor.

Figure 2:
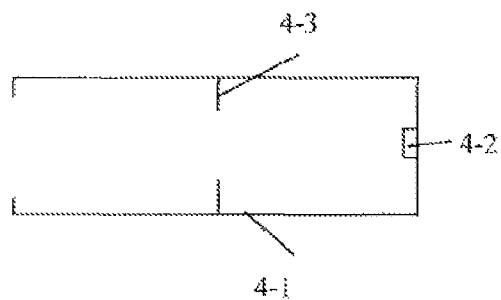
FIG. 2 is the schematic of the light detecting tube of the invention.
Figure 3:
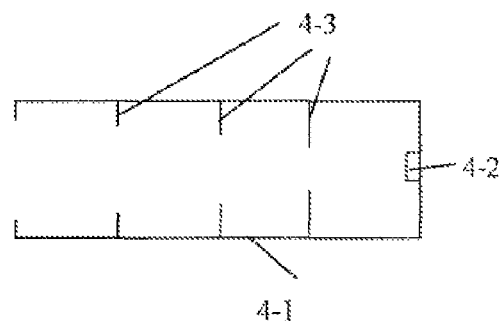
FIG. 3 is the schematic of the light detecting tube with the light trap.

As shown in FIG. 2, the light detecting tube comprises the tube 4-1 and the photo-detector 4-2 installed inside the tube 4-1. In order to reduce the stray light entering to the photo-detector 4-2, the light trap 4-3 with a hole in the center can be installed on the front of the photo-detector 4-2 of the light detecting tube. The light trap 4-3 can be one piece or a plurality of pieces (see FIG. 3).

Figure 4:
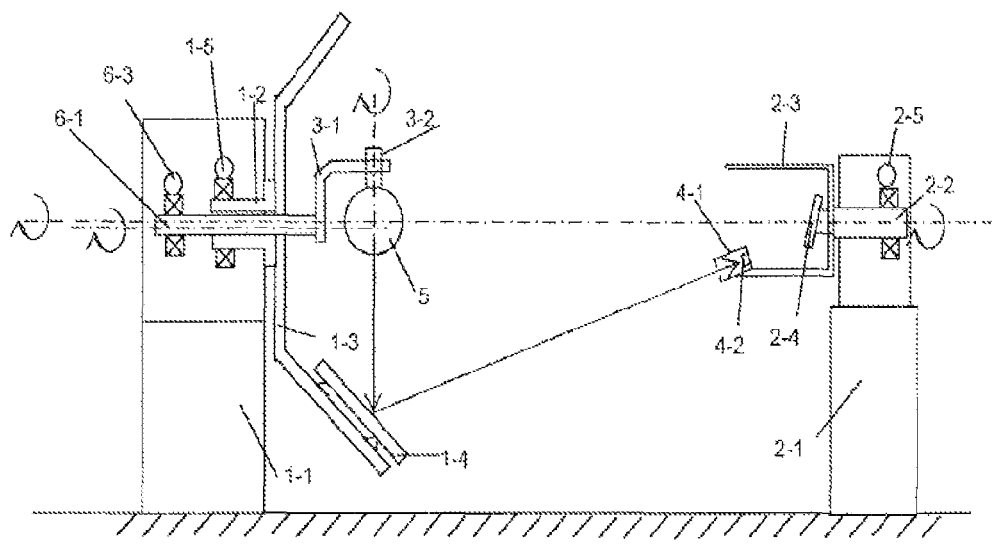
FIG. 4 is the schematic of the second structure of the invention.

In the structure of the goniophotometer as shown in FIG. 4, an auxiliary axis 6-1 is installed on the main base 1-1. The auxiliary axis 6-1 is located inside the main rotating axis 1-2. One side of the auxiliary axis 6-1 extends the main rotating axis 1-2 and the main mirror arm 1-3. The luminaire fixture 3-1 is installed on the extended end of the auxiliary axis 6-1. The auxiliary axis 6-1 can be driven manually or by the auxiliary motor 6-3 to rotate.

Figure 5:
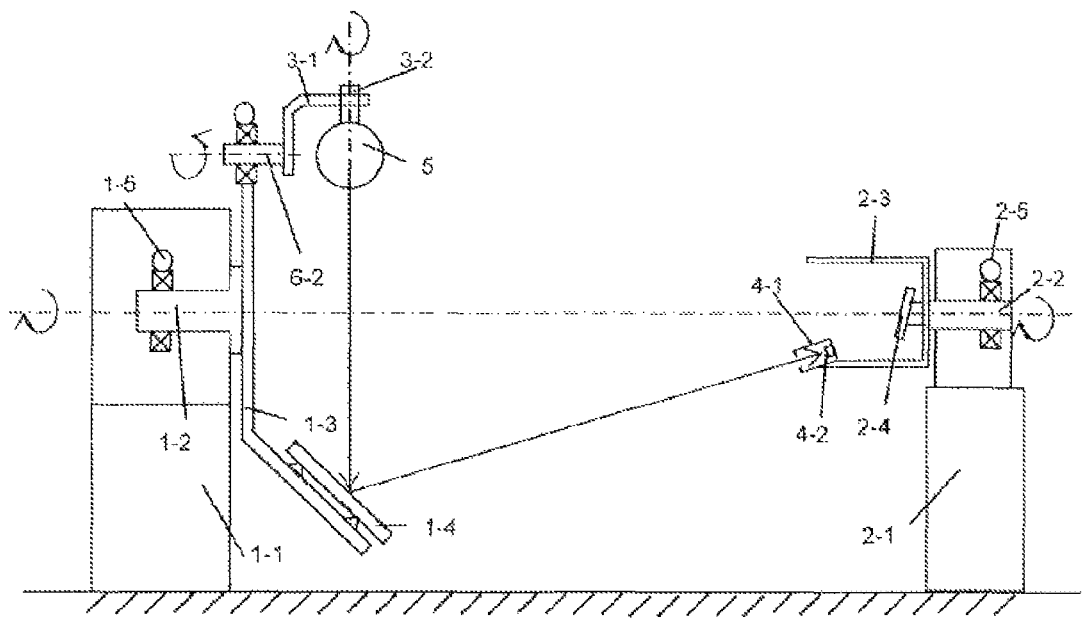
FIG. 5 is the schematic of the third structure of the invention.

In the structure of the goniophotometer as shown in FIG. 5, the sync-retrograding rotating axis 6-2 which is parallel to the main rotating axis 1-2 is installed on the main mirror arm 1-3. The luminaire fixture 3-1 is fixed on the sync-retrograding rotating axis 6-2.

Figure 6:
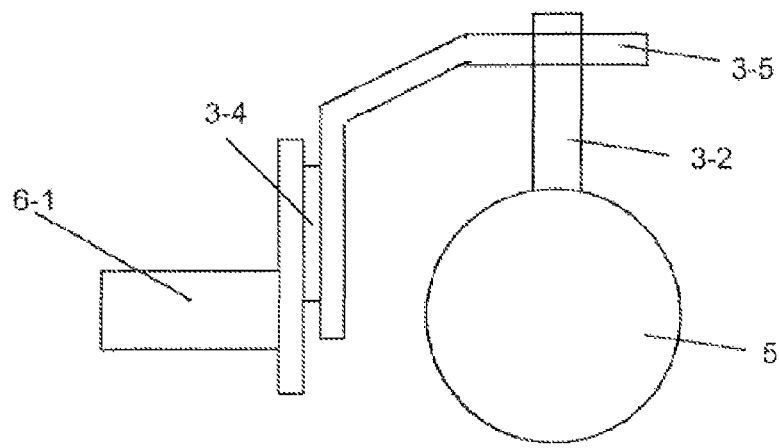
FIG. 6 is the schematic of one structure of the luminaire fixture of the invention.

The luminaire fixture 3-5 adopted by the invention, as shown in FIG. 6, comprises a moving table 3-4 and a luminaire fixture 3-5 sliding connected to the moving table 3-4. The luminaire rotating axis 3-2 is installed on the luminaire fixture 3-5. Thus, through the movement of the moving table, the central location of the luminaire under test can be conveniently regulated.

Figure 7:
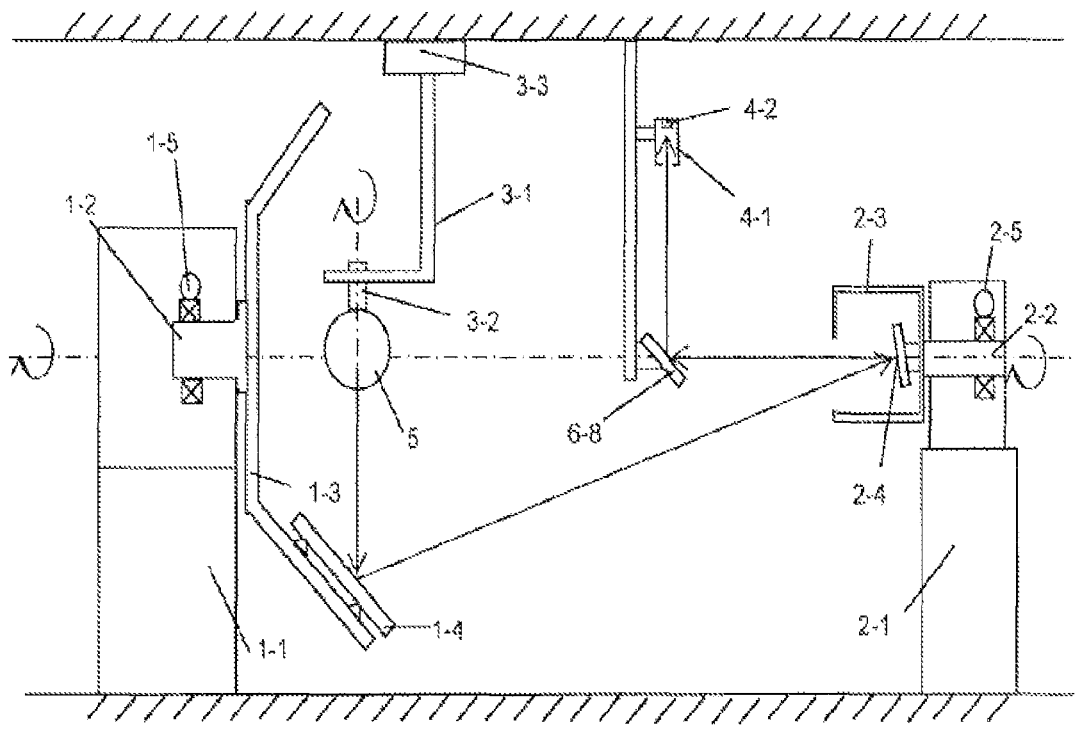
FIG. 7 is the schematic of the forth structure of the invention.

In the structure of the goniophotometer as shown in FIG. 7, a turning mirror 6-8 is arranged in the reflection path of the sync-mirror 2-4. The light detecting tube is located in the reflection path of the turning mirror 6-8.

The light detecting tube of the goniophotometer can be installed in the incident light path or the reflection path of the main mirror 1-4. It can also be installed in the reflection path of the sync-mirror 2-4 or the reflection path of the turning mirror 6-8.

Figure 8:
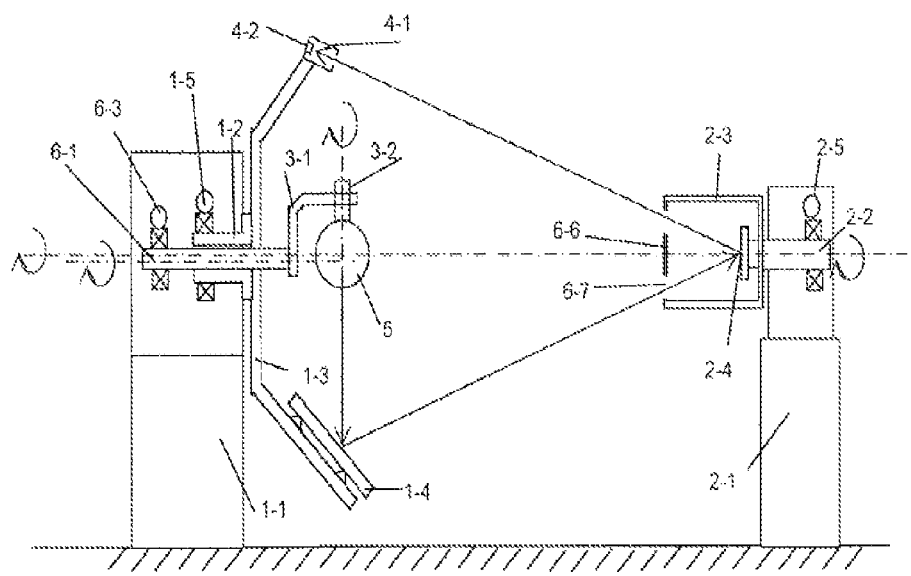
FIG. 8 is the schematic of the fifth structure of the invention.
Figure 9:
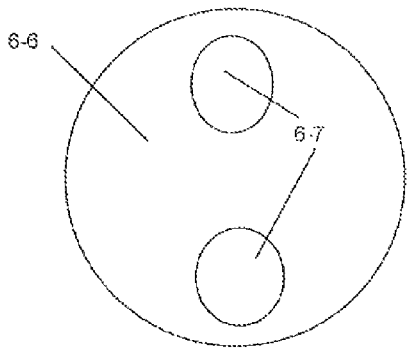
FIG. 9 is the schematic of one diaphragm of the invention.
Figure 10:
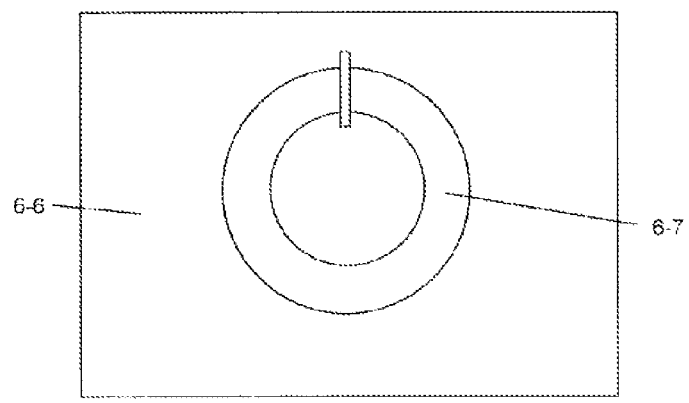
FIG. 10 is the schematic of the other diaphragm of the invention.

In order to reduce the measuring error and eliminate the impact of the stray light, the diaphragm 6-6 can be positioned in the light path. The diaphragm 6-6 has an aperture 6-7. The diaphragm 6-6, as shown in FIG. 8, can be fixed on the sync-mirror arm 2-3. The aperture 6-7 on the diaphragm, as shown in FIG. 9, is located in the incident light path of the sync-mirror and the emergent light path of the sync-mirror 2-4; the diaphragm 6-6, as shown in FIG. 1, can be located in the emergent light path between the main rotating table and the sync-rotating table. As shown in FIG. 10, the aperture 6-7 is ring. The installations of the two diaphragms can be used synchronously.

The invention claimed is:

1. A goniophotometer comprising:
    a main rotating table, a sync-rotating table, a luminaire rotating table and light detecting tubes;
    the main rotating table includes a main base (1-1) and a main rotating axis (1-2) installed on the main base (1-1), the main rotating axis (1-2) is fixed with a main mirror arm (1-3), a main mirror (1-4) is installed on the main mirror arm (1-3);
    the sync-rotating table includes a sync-base (2-1), a sync-rotating axis (2-2) is installed on the sync-base (2-1), the sync-rotating axis (2-2) is coaxial with the main rotating axis (1-2), a sync-mirror arm (2-3) is installed on the sync-rotating axis (2-2), a sync-mirror (2-4) is installed on the sync-mirror arm (2-3), the sync-mirror (2-4) is located on a reflection path of the main mirror (1-4), a reflection path of the sync-mirror (2-4) is located on the sync-rotating axis (2-2);
    the luminaire rotating table includes a luminaire fixture (3-1), and a luminaire rotating axis (3-2) installed on the luminaire fixture (3-1), the luminaire rotating axis (3-2) is perpendicular to the main rotating axis (1-2), the luminaire rotating axis (3-2) is for fixedly connecting with a luminaire under test (5);
    the light detecting tubes are installed at light path.

2. The goniophotometer as claimed in the claim 1, wherein the light detecting tube is arranged on the reflection path of the sync-mirror (2-4).

3. The goniophotometer as claimed in the claim 1, wherein the light detecting tube comprises a tube (4-1), a detector (4-2) installed inside the tube (4-1) and a block board with a hole in the center (4-3) installed on front of the detector (4-2).

4. The goniophotometer as claimed in the claim 1, wherein an auxiliary axis (6-1) is installed on the main base (1-1), the auxiliary axis (6-1) is located on the main rotating axis (1-2), one end of the auxiliary axis (6-1) extends out of the main rotating axis (1-2) and the main mirror arm (1-3), the luminaire fixture (3-1) is installed on the extended end of the auxiliary axis (6-1).

5. The goniophotometer as claimed in the claim 1, wherein a turning mirror (6-8) is arranged in the reflection path of the sync-mirror (2-4), the light detecting tube is installed in a reflection path of the turning mirror (6-8).

6. The goniophotometer as claimed in the claim 1, wherein a light path for installing the light detecting tube is an incident light path or a reflection path of the main mirror (1-4) or a reflection path of the sync-mirror (2-4).

7. The goniophotometer as claimed in the claim 6, wherein a diaphragm (6-6) with aperture (6-7) is arranged in the beam path.

8. The goniophotometer as claimed in the claim 6, wherein the diaphragm (6-6) is fixed on the sync-mirror arm (2-3), the aperture (6-7) on the diaphragm is located in an incident light path and emergent light path of the sync-mirror (2-4), or the diaphragm (6-6) is located in a beam path between the main rotating table and the sync-rotating table, the shape of aperture (6-7) is ring.

9. The goniophotometer as claimed in the claim 1, wherein the light detecting tubes are arranged on the reflection path of the sync-mirror (2-4).

10. The goniophotometer as claimed in the claim 1, wherein each light detecting tube comprises a tube (4-1), a detector (4-2) installed inside the tube (4-1) and a block board with a hole in the center (4-3) installed on front of the detector (4-2).

11. The goniophotometer as claimed in the claim 1, wherein an auxiliary axis (6-1) is installed on the main base (1-1), the auxiliary axis (6-1) is located on the main rotating axis (1-2), one end of the auxiliary axis (6-1) extends out of the main rotating axis (1-2) and the main mirror arm (1-3), the luminaire fixture (3-1) is installed on the extended end of the auxiliary axis (6-1).

12. (The goniophotometer as claimed in the claim 2-1, wherein a turning mirror (6-8) is arranged in the reflection path of the sync-mirror (2-4), the light detecting tube is installed in a reflection path of the turning mirror (6-8).

13. The goniophotometer as claimed in the claim 1, wherein a light path for installing the light detecting tubes is an incident light path or the reflection path of the main mirror (1-4) or the reflection path of the sync-mirror (2-4).

\* \* \* \* \*